United States Patent [19]

Dubini

[11] 4,427,137

[45] Jan. 24, 1984

[54] METERING VALVE FOR DISPENSING PRESSURIZED LIQUIDS

[75] Inventor: Uberto Dubini, Lecco, Italy

[73] Assignee: S.p.A. Valvole Aerosol Research Italiana -V.A.R.I., Olginate, Italy

[21] Appl. No.: 304,430

[22] Filed: Sep. 21, 1981

[30] Foreign Application Priority Data

Nov. 19, 1980 [IT] Italy ............................. 26098 A/80

[51] Int. Cl.³ .............................................. B65D 83/00
[52] U.S. Cl. .................................. 222/402.2; 222/288
[58] Field of Search .................... 222/402.2, 394, 288, 222/278; 137/269

[56] References Cited

FOREIGN PATENT DOCUMENTS 2605474 8/1976 Fed. Rep. of Germany ... 222/402.2
1292114 3/1962 Italy ................................. 222/402.2

Primary Examiner—Joseph J. Rolla
Assistant Examiner—Kenneth Noland
Attorney, Agent, or Firm—Guido Modiano; Albert Josif

[57] ABSTRACT

A metering valve, wherein the cylindrical body or bowl which defines the liquid metering chamber in cooperation with the valve stem comprises a lower portion adapted for contact engagement with the valve stem such as to shut off the communication between the metering chamber and a container element, with the stem in a closure position, and an upper body associable with the lower portion and interchangeable to determine the useful volume of the metering chamber.

2 Claims, 2 Drawing Figures

METERING VALVE FOR DISPENSING PRESSURIZED LIQUIDS

BACKGROUND OF THE INVENTION

This invention relates to a metering valve for dispensing pressurized liquids, particularly for use with containers of the so-called spray-can type.

Currently available on the market are metering valves for spray-cans, which are so constructed as to allow a pre-proportioned amount of the product to be dispensed at each actuation of the valve control pushbutton.

Such valves, in one known form thereof, comprise essentially a bowl element which is associated in sealed relationship with the mouth of the container or can be means of a folded seam collar. Within said bowl element, there is axially slidable, against the bias of an elastic means, a valve stem.

Inside the bowl element, there is further provided a cylindrical portion, generally formed from an elastically deformable material, which defines along the bottom portion thereof a lip type of seal adapted for engagement with the valve stem, in contact relationship therewith, when said stem is in its dispensing position. More specifically, the stem can be actuated to selectively put the metering chamber defined between said stem and the cylindrical body, into alternative communication with the outside, and hence in a dispensing condition, or with the inside of the container or can.

With the latter approach, it happens that, where the useful volume of the metering chamber is to be changed, i.e., when it is desired to change the amount of product dispensed at each actuation, the cylindrical body must be replaced as a whole, along with the bowl element and the collar which secures it to the container.

It will be appreciated, therefore, how in order to change the dispensed proportions the majority of the metering valve components have to be replaced with others having different dimensions; thus to accommodate the wide range of proportions required, the manufacturer is obliged to store high quantities of different size components, which creates a problem both as regards the inventory and the production thereof.

SUMMARY OF THE INVENTION

This invention sets out to eliminate such past drawbacks by providing a metering valve so designed and constructed as to allow the useful volume of the metering chamber to be changed without involving alteration of a high number of components, and requiring in practice the availability of but a number of standard elements which do not require to be modified to suit the volume of the metering chamber to be preset, and of a single interchangeable element for accommodating diverse contingent requirements.

Within the above general aim, it can be arranged that the inventive metering valve for dispensing pressurized lquids, additionally to having a greatly simplified construction, is also highly reliable and safe to use.

It is further possible to arrange that the metering valve of this invention, while enabling a significant rationalization of its various manufacturing steps, can also bring about appreciable advantages from the standpoint of production costs.

According to one aspect of the present invention, there is provided a metering valve for dispensing pressurized liquids which comprises a bowl element sealingly associable with the mouth of a container and carrying, axially slidable therein, a valve stem operable to selectively put into communication with the interior and exterior of said container a metering chamber defined between said valve stem and a substantially cylindrical body accommodated in said bowl element, and characterized in that said substantially cylindrical body comprises a lower portion adapted for contact engagement with said valve stem to shut off the communication between said metering chamber and said container, with said stem in the dispensing position thereof, and an upper body associable with said lower portion and being interchangeable for determining the useful volume of said metering chamber.

BRIEF DESCRIPTION OF THE DRAWING

Further features and advantages will become more openly apparent from the following description of a preferred, but not limitative, embodiment of a metering valve for dispensing pressurized liquids according to this invention, with reference to the accompanying exemplary drawing, where.

DESCRIPTION OF THE PREFERRED EMBODIMENTS

Figures 1, 2:
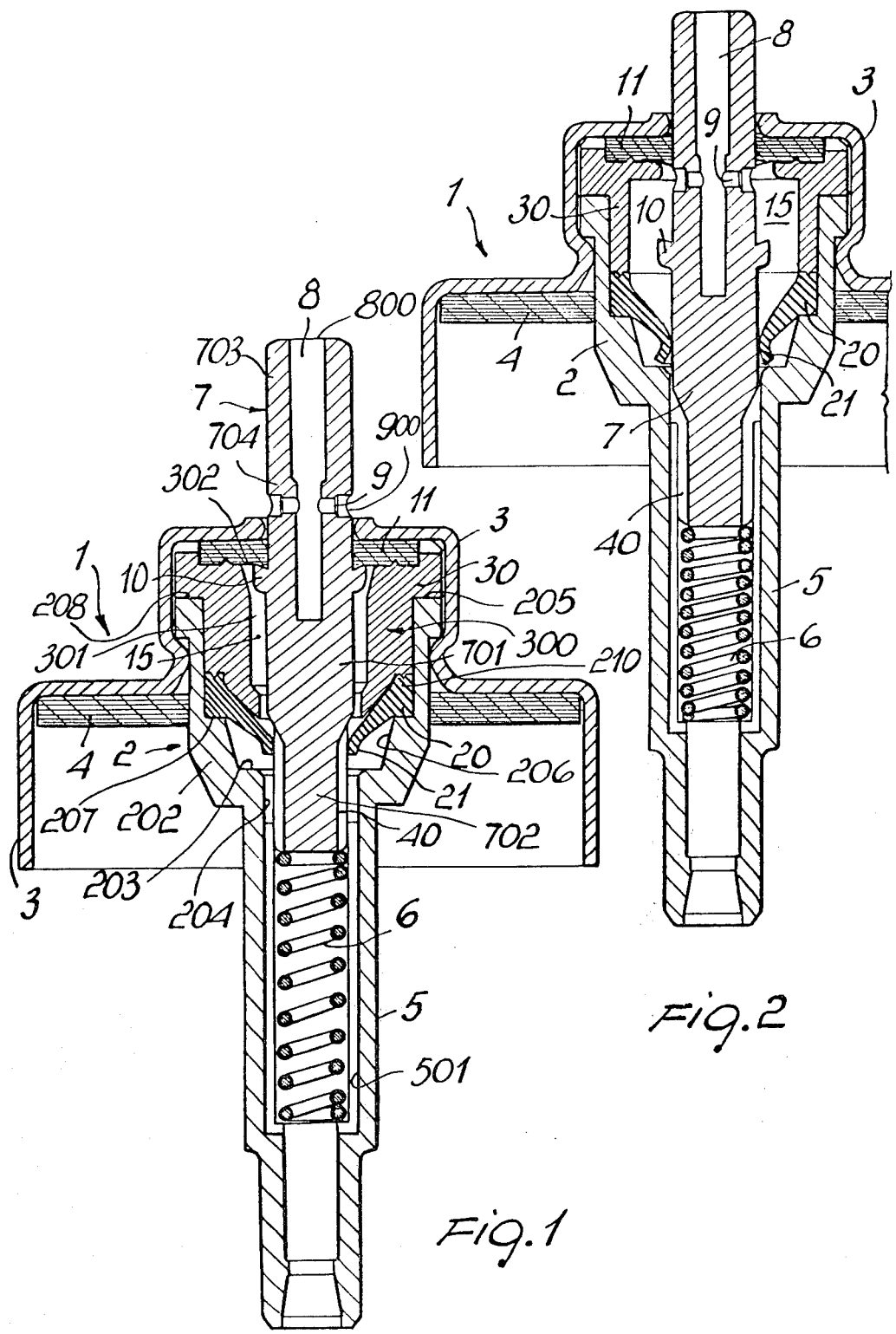
FIG. 1 shows schematically an axial section through a metering valve in the closed position, with the upper body determining the minimum volume for the metering chamber.
FIG. 2 illustrates the metering valve with the valve stem in the dispensing position, and with the upper body determining the maximum useful volume for the metering chamber.

With reference to the drawing figures, the metering valve for dispensing pressurized liquids, according to the invention, is generally indicated at 1 and comprises a bowl element 2, which can be associated with the mouth of a container by means of a small hood 3 fold-seamed to the container with the interposition of a sealing gasket 4.

From the lower or bottom portion of the bowl element 2, there depends axially a hollow spigot 5, open at the bottom and communicating with the container interior, which accommodates, for sliding movement against the bias of an elastic means including a spring 6, the lower portion of a valve stem 7 the upper end whereof protrudes out of the hood 3 and is formed with an axial recess 8 having at least one radial hole 9 which, in the inoperative position, is positioned on the exterior of the hood 3, and, in the operative or dispensing position, as determined by the downward translation of the stem 7 against the bias of the spring 6, puts the metering chamber, as defined inside the bowl 2, in communication with the outside.

More in detail, the stem 7 is provided with an annular embossment 10 which, with the stem in the upper position, abuts against an upper gasket 11 to sealingly separate the interior of the container from the outside environment.

A peculiar characteristic of the invention resides in that between the bowl element 2 and stem 7 there intervenes a cylindrical body, effective to determine the volume of the metering chamber, which comprises a lower portion 20, made of an elastically deformable material, which has a lipped frustoconical taper 21 and is adapted for engagement with the body of the valve stem 7 to provide a fluid-tight seal between the metering chamber, indicated at 15, and the interior of the container when the stem 7 is in its dispensing position.

The cited cylindrical body includes an upper body 30 of an interchangeable type, which can be connected to the upper edge of the lower portion 20 and is held pressed on the bowl element 2 by the hood 3.

The cited upper body is, as evidenced in the drawing, readily interchangeable to vary the useful volume of the metering chamber 15 by simply changing a single element, represented indeed by the upper body 30, and leaving unaltered all the other components of the metering valve.

It should be added that, to facilitate the coupling together of the lower portion 20 and upper body 30, male and female connectors may be respectively provided at the mating areas between the lower portion and upper body 30.

For a more complete description, it should be further added that the lower portion of the stem 7 is preferably provided with ribs 40, wherewith there engages in contact relationship the taper 21 of the lower portion 20, with the valve in the inoperative or non-dispensing position, enabling the communication between the metering chamber and the interior of the container, to thus ensure that the product within the container always fills the metering chamber.

The operation of this metering valve is similar to that of conventional valves. In fact, with the stem 7 in its upper position (FIG. 1), the metering chamber 15 is in communication with the container interior, and consequently the product will flow into the chamber. By manipulating the sem 7, with a depressing action which overcomes the elastic bias of the spring 6, the stem is moved downwards to engage with its solid portion the gasket 21, thus shutting off the communication between the metering chamber and the container interior, while at the same time communicating with the metering chamber the radial holes 9 which allow the product to be dispensed out through the axial recess or seat 8.

It will be appreciated from the foregoing description that the invention achieves its objects, and the fact should be pointed out that, by providing the cylindrical body which determines the volume of the metering chamber with two separated elements, only one of which requires replacement to change the metering volume, the construction of the valve is considerably simplified, and the advantage is afforded to the manufacturer of the valve of having but a single element, consisting of the upper body 30, to replace in order to provide the diverse proportions demanded by the market.

The fact should also be mounted that it would be possible, in principle, to provide the cylindrical body in one piece, but in this case, when reduced volume metering chambers are to be provided, the cylindrical portion would have to be made with a considerable thickness, which results in a significant cost increase owing to the necessary utilization of comparatively valuable materials, at least for the area which provides the seal between the stem and cylindrical body. Accordingly, the solution adopted of a cylindrical body in two pieces affords the possibility of making the sealing part from a valuable material, and the part for practically adjusting the volume from a material of substantially lower cost.

The invention as described is susceptible to many modifications and variations, all of which fall within the scope of the inventive concept.

Moreover, all of the details may be replaced with other technically equivalent elements.

In practicing the invention, the materials used, on condition that they are compatible with the intended application, and the dimensions and contingent shapes, may be any ones according on individual requirements.

From the foregoing description and especially from the drawing, it will be understood that the metering valve device for dispensing pressurized fluids of this invention comprises a bowl element 2 having an elongated tubular portion 5 with a hollow duct interior 501 and an enlarged inverted bell-like portion 202 having a bottom 203 with an opening 204 therein and an open top 205 opposite to said bottom 203, said enlarged inverted bell-like portion 202 having an enlarged cavity 206 therein in communication with said hollow duct interior 501 of said tubular portion 5 extending from the bottom 203 of said inverted bell-like portion 202 and coaxial therewith, seat formations 207, 208 in said enlarged cavity 206, a sleeve-like structure 300 received in said seat formations 207, 208 within said enlarged cavity 206 coaxial therewith, said sleeve-like structure 300 having an open ended hollow inside 301 and a substantially cylindrical portion 30 with a first open end 302 and an opposite funnel-like open end portion 20 facing said hollow duct interior 501 in selective communication with said hollow inside 301, an axially slidable valve stem 7 extending through said open ended hollow inside 301 coaxial therewith, said valve stem 7 having a main portion 701 and an at least partially reduced diameter end portion 702 extending beyond said hollow inside 301 through said funnel-like portion 20 into said hollow duct interior 501, said main portion 701 having a diameter less than the diameter of said hollow inside 301 thereby to leave an annular space 15 therebetween, said funnel-like portion 20 having an end aperture annular lip 21 with a diameter less than the diameter of said main portion 701, said main portion 701 having an end extension 703 extending beyond said hollow inside 301 through said first open end 302 of said open ended hollow inside 301 into the outside, said reduced diameter end portion 702 of said valve stem 7 having a diameter not greater than the inner diameter of said hollow duct interior 501, duct means 8, 9 in said main portion 701 of said valve stem 7 having at least one first end aperture 800 opening into the outside at said end extension 703 of said main portion 701 of said stem 7 and at least one second aperture 900 opening at a circumferential periphery of said main portion 701 of said valve stem 7, sealing means 11 at said first open end 302 of said hollow inside 301 between said sleeve structure 300 and said main portion 701 of said valve stem 7, stop means 10 for defining the stroke of axial displacement of said valve stem 7 from an extended position in which said annular space 15 is sealed off with respect to the outside to a retracted position in which said second aperture 900 opens into said annular space 15 to provide communication between said annular space 15 and the outside through said duct means 8, 9 and said first aperture 800 thereof, said annular space 15 between said sealing means 11 and said funnel-like portion 20 defining the metering volume for the pressurized fluid to be dispensed, supporting means 3, 4 for said bowl element 2 for connection with a pressurized fluid container, wherein according to the improvement said sleeve-like structure 300 comprises said funnel-like open end portion 200 in the form of a first independent annular valve lip member 20, 21 for cooperating with said valve stem 7 and said substantially cylindrical portion 30 in the form of a second independent substantially cylindrical interchangeable member having a preestablished thickness and inner shape, said first independent annular valve lip member 20, 21 and said second independent interchangeable substantially cylindrical member 30 having mutually mating surfaces 210 with engagement formations for removable mutual engagement and said enlarged inverted bell-like portion 202 having first seat formations 207 for permanently receiving therein said first independent annular valve lip member 20, 21 and having second seat formations 208 for removably receiving therein said second independent interchangeable substantially cylindrical member 30 thereby to render said metering volume defined by said annular space 15 dependent on the selected thickness and shape of said second independent interchangeable substantially cylindrical member 30.

I claim:

1. A metering valve device for dispensing pressurized fluids, comprising a bowl element having an elongated tubular portion with a hollow duct interior and an enlarged inverted bell-like portion having a bottom with an opening therein and an open top opposite to said bottom, said enlarged inverted bell-like portion having an enlarged cavity therein in communication with said hollow duct interior of said tubular portion extending from the bottom of said inverted bell-like portion and coaxial therewith, seat formations in said enlarged cavity, a sleeve-like structure received in said seat formations within said enlarged cavity and coaxial therewith, said sleeve-like structure having an open ended hollow inside and a substantially cylindrical portion with a first open end and an opposite funnel-like open end portion facing said hollow duct interior in selective communication with said hollow inside, an axially slidable sleeve stem extending through said open ended hollow inside and coaxial therewith, said valve stem having a main portion and an at least partially reduced diameter end portion extending beyond said hollow inside, through said funnel-like portion and into said hollow duct interior, said main portion having a diameter less than the diameter of said hollow inside thereby to leave an annular space therebetween, said funnel-like portion having an end aperture annular lip with a diameter less than the diameter of said main portion, said main portion having an end extension extending beyond said hollow inside, through said first open end of said open ended hollow inside, and into the outside of the container, said reduced diameter end portion of said valve stem having a diameter not greater than the inner diameter of said hollow duct interior, duct means in said main portion of said valve stem having at least one first end aperture opening into the outside at said end extension of said main portion of said stem and at least one second aperture opening at a circumferential periphery of said main portion of said valve stem, sealing means at said first open end of said hollow inside between said sleeve structure and said main portion of said valve stem, stop means for defining the stroke of axial displacement of said valve stem from an extended position in which said annular space is sealed off with respect to the outside to a retracted position in which said second aperture opens into said annular space to provide communication between said annular space and the outside through said duct means and said first aperture thereof, said annular space between said sealing means and said funnel-like portion defining the metering volume for the pressurized fluid to be dispensed, supporting means for said bowl element for connection with a pressurized fluid container, wherein according to the improvement said sleeve-like structure comprises said funnel-like open end portion in the form of a first independent annular valve lip member for cooperating with said valve stem and said substantially cylindrical portion in the form of a second independent substantially cylindrical interchangeable member having a preestablished thickness and inner shape, said first independent annular valve lip member and said second independent interchangeable substantially cylindrical member having mutually mating surfaces with engagement formations for removable mutual engagement and said enlarged inverted bell-like portion having first seat formations for permanently receiving therein said first independent annular valve lip member and having second seat formations for removably receiving therein said second independent interchangeable substantially cylindrical member thereby to render said metering volume defined by said annular space dependent on the selected thickness and shape of said second independent interchangeable substantially cylindrical member.

2. A device according to claim 1, wherein said at least partially reduced diameter and portion of said valve stem has longitudinal rib formations between which fluid passages are formed.

* * * * *